United States Patent [19]

Munzinger et al.

[11] Patent Number: 4,700,270

[45] Date of Patent: Oct. 13, 1987

[54] METAL-ENCAPSULATED GAS-INSULATED SWITCHING SYSTEM

[75] Inventors: Karl Munzinger, Oberhasli; Friedrich Pinnekamp, Siggenthal-Station, both of Switzerland

[73] Assignee: BBC Brown, Boveri & Company, Limited, Baden, Switzerland

[21] Appl. No.: 694,258

[22] Filed: Jan. 24, 1985

[30] Foreign Application Priority Data

Feb. 14, 1984 [CH] Switzerland ............................ 700/84
Mar. 30, 1984 [CH] Switzerland .......................... 1629/84

[51] Int. Cl.$^4$ ............................................. H02B 1/04
[52] U.S. Cl. .................................. 361/341; 200/148 E; 200/148 R
[58] Field of Search ........... 200/148 A, 148 B, 148 R, 200/148 G, 148 D, 148 E, 148 F; 361/332, 341

[56] References Cited

U.S. PATENT DOCUMENTS

| | | | |
|---|---|---|---|
| 1,992,024 | 2/1935 | Davies | 361/341 |
| 2,345,033 | 3/1944 | Claybourn | 361/341 |
| 3,619,726 | 11/1971 | Boersma | 361/341 |
| 4,045,634 | 8/1977 | Nakano et al. | 200/148 E |
| 4,362,914 | 12/1982 | Adolph et al. | 200/148 R |

FOREIGN PATENT DOCUMENTS 3215236 4/1982 Fed. Rep. of Germany .
0416704 7/1933 United Kingdom ................ 361/341

Primary Examiner—A. D. Pellinen
Assistant Examiner—Gregory D. Thompson
Attorney, Agent, or Firm—Burns, Doane, Swecker & Mathis

[57] ABSTRACT

The switching system, preferably suitable for distributing electric energies of medium-high voltage, includes a metal housing which is filled with insulating gas and in which at least one circuit breaker, one isolating switch, one earthing or grounding system and one busbar are arranged. In this arrangement, the contact arrangement of the circuit breaker is located in a housing which is accessible from the outside without intervention in a busbar housing which contains the busbar. This system saves parts and has a small space requirement while its components subject to the most wear are easy to maintain. This is achieved by the fact that the contact arrangement of the isolating switch is provided in the busbar housing and that the housing of the circuit breaker is provided with a housing part of insulating material which penetrates the wall of the busbar housing as a gas-tight current lead-through. In a system of three-phase design, the volume of the busbar housing is additionally reduced by the fact that the three phase conductors of the busbar are helically wound around a common axis.

9 Claims, 3 Drawing Figures

METAL-ENCAPSULATED GAS-INSULATED SWITCHING SYSTEM

BACKGROUND OF THE INVENTION

This invention relates to electrical switching, and more particularly to metal-encapsulated gas-insulated switching systems.

In the prior art as described in German Offenlegungsschrift No. 3,215,236, the circuit breaker and isolating common bulkhead compartment and can be removed during maintenance work without having to disconnect the busbar. However, this switching system requires a relatively large number of insulating parts and, in addition, requires a relatively large amount of space since between the bulkhead compartment containing the switches and the compartmented busbars an intermediate space is required the dimensions of which must be such that it can accommodate the entire length of the isolating switch.

OBJECT AND SUMMARY OF THE INVENTION

An object of the invention is to construct a switching system of the above-described type in such a manner that this system is distinguished by saving parts and by requiring little space while featuring great ease of maintenance of its components subject to most wear.

The switching system according to the invention is characterised by the fact that the circuit breakers used in this sytem are easily accessible from the outside. This is why installation and inspection work can be carried out at the circuit breakers, which, of all components of the switching system, are most subject to wear, without the necessity of switching off the busbar. By using a part of the housing of the circuit breaker as a duct through the metal wall of the busbar housing, bulkhead insulators between the interior of the busbar housing and the interior of the switch, which generally is at a higher pressure, can be omitted and simultaneously a particularly space-saving arrangement can be achieved.

BRIEF DESCRIPTION OF THE DRAWINGS

To provide a more detailed explanation, in the test which follows an illustrative embodiment of the invention is explained in greater detail with the aid of the drawing, in which.

DETAILED DESCRIPTION OF THE PREFERRED EMBODIMENT

In the figures, identical parts are provided with identical reference designations.

Figure 1:
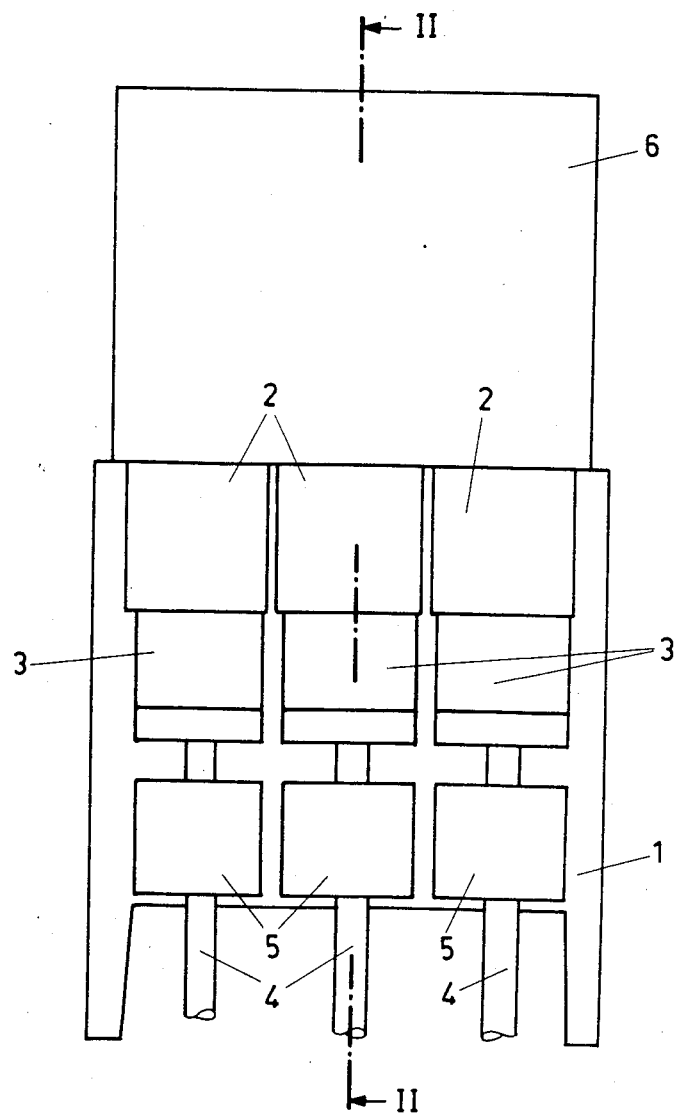
FIG. 1 is a front view of a switching system, constructed in accordance with the invention.

As shown in FIG. 1, a housing 1 of a switching system has mounted thereat, three circuit breakers 2, associated with the phases R, S, T of a three-phase system. The circuit breakers 2 are connected by means of cable terminals 3 to cables 4 which are surrounded by wound toroidal cores 5 of inductive instrument transformers. The circuit breakers 2 are actuated by an actuator 6.

Figure 2:
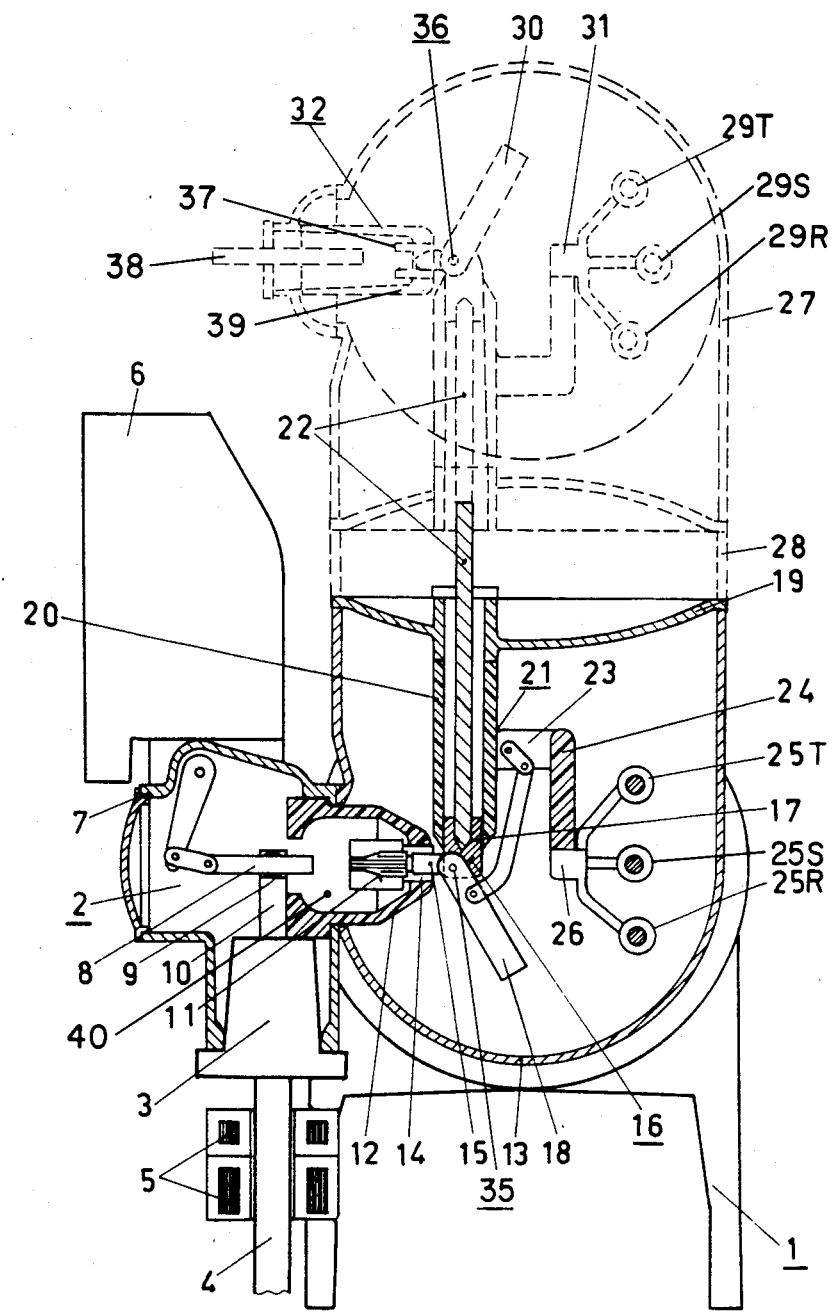
FIG. 2 is a sectional view along II—II of the switching system according to FIG. 1.

According to FIG. 2, the actuator 6 acts via a lever system, not designated, on a moving contact 8, located in a housing 7 filled with insulating gas, of the circuit breaker 2. The insulating gas provided for the circuit breaker 2 is preferably sulphur hexafluoride with a pressure of 5 to 6 bar. Another insulating gas, for example a mixture of sulphur hexafluoride and air, can also be used. It is also conceivable that the circuit breaker is constructed as a vacuum switch.

The contact 8 is electrically conductively connected via a sliding contact 9 to the current-carrying conductor 10 of the cable 4 and operates in conjunction with a fixed contact 11 located in the housing 7. The contact system, comprising the moving and the fixed contacts, of the circuit breaker 2 is surrounded by a quenching chamber 40 which is in communication with the interior of the housing 7. The wall 12 of the quenching chamber 40 consists of insulating material and delimits the interior of the housing 7 of the circuit breaker with respect to the interior of a lower busbar housing 13 which is sealed to be gas-tight and filled with sulphur hexafluoride at a pressure of approximately 1 to 1.5 bar.

A current connection 14, carrying the fixed contact 11, is carried in a gas-tight manner through the quenching chamber wall 12 into the interior of the lower busbar housing 13 and its end located in the lower busbar housing 13 is constructed as a sleeve. Into this sleeve, an end, constructed as a plug 15, of a coupling part 16 is introduced. The coupling part 16 carries a contact 17, constructed to be hollow, and a rotatably supported moving contact 18 of an isolating switch 35. The coupling part 16 is mounted in a gas-tight manner on a part 20, which is constructed to be tubular and mounted on a removable cover 19 of the lower busbar housing 13, of a support insulator 21. A rod 22, which can be earthed or grounded, can be inserted through an opening, provided in the cover 19, and the hollow interior of the tubular part 20 of the support insulator 21 into the contact 17.

In addition, the support insulator 21 is provided with an insulating part 24, which is mounted via a connecting piece 23 on the tubular part 20 and which carries one of the phases of a three-phase busbars 25R, 25S, 25T and the fixed contact 26 of the isolating switch 35. The moving contact 18 of the isolating switch 35 is actuated by a lever system, not designated, which is supported on the connecting piece 23.

This switching system can be mounted in a simple manner. Together with the cover 19, the isolating switch 35 and the busbars, mounted on the support insulator 21, are installed in the lower busbar housing 13, after which the circuit breaker 2 is pushed laterally into the lower busbar housing 13 and the quenching chamber wall 12 is clamped gas-tight to a flange of the lower busbar housing 13. During this process, the current connection 14 and the plug 15 are brought into electrically conductive contact with each other. The isolator actuator (not shown) can act via a shaft, not shown and introduced above the plane of the section into the lower busbar housing 13, on the lever system supported at the connecting piece 23. With suitable dimensions of the isolating switch actuator (not shown), however, the shaft, not shown, can also act directly on the moving contact 18, supported on the coupling part 16, of the isolating switch 35.

Maintenance of this system is also simple since the circuit breaker 2, as the part subject to the heaviest wear, of the system is accessible from the outside to the installation personnel without having to open the lower busbar housing 13. During an inspection of the circuit breaker 2, it is only necessary to switch off the circuit breaker and isolating switch 35 and to earth or ground the coupling part 16 by introducing the rod 22. In this connection, earthing or grounding can be accomplished by the electrically conductive connection of the rod 22 to the lower busbar housing 13. After the insulating gas has been discharged from the switch housing 7 and the housing has subsequently been opened, inspection work can then be carried out on the circuit breaker 2. If faults occur on the isolating switch 35 or on the busbars 25R, 25S, 25T, these faults can be eliminated after the circuit breaker 2 has been switched off and the busbar 25R, 25S, 25T have been earthed or grounded via the isolating switch 35 and the rod 22 without having to remove the circuit breaker 2.

Constructing the earthing or grounding switch as a plug-in earth or ground electrode makes it possible to mount a second busbar housing 27 in mirror symmetry on the lower busbar housing 13. As shown with dashed lines in FIG. 2, this upper housing 27 can be placed in a gas-tight manner onto the lower housing 13, using a tubular intermediate part 28 and can be provided with components, which are arranged and configured in correspondence with the lower busbar housing 13, such as busbars 29R, 29S, 29T and isolating switches 36 having contacts 30, 31. However, an earthing or a grounding switch 32 having switch components 37, 38 and 39 can be provided on the upper busbar housing 27 instead of a circuit breaker. In this system, the rod 22 acts as a conductive connection between the upper and lower system. In this switching system after the circuit breaker 2 has opened and the earthing or grounding switch 32 has closed, maintenance work can be carried out in the lower busbar housing 13 with the lower isolating switch 35 closed and the upper isolating switch 36 opened. Busbars 29R, 29S, 29T are then still ready for operation. Correspondingly, maintenance work can be carried out in the upper busbar housing 27 when the lower busbars 25R, 25S, 25T are disconnected and the upper, with opened circuit breaker 2 busbars 29R, 29S, 29T is brought to earth or ground potential via the upper isolating switch 36 and the closed earthing switch 32.

Figure 3:
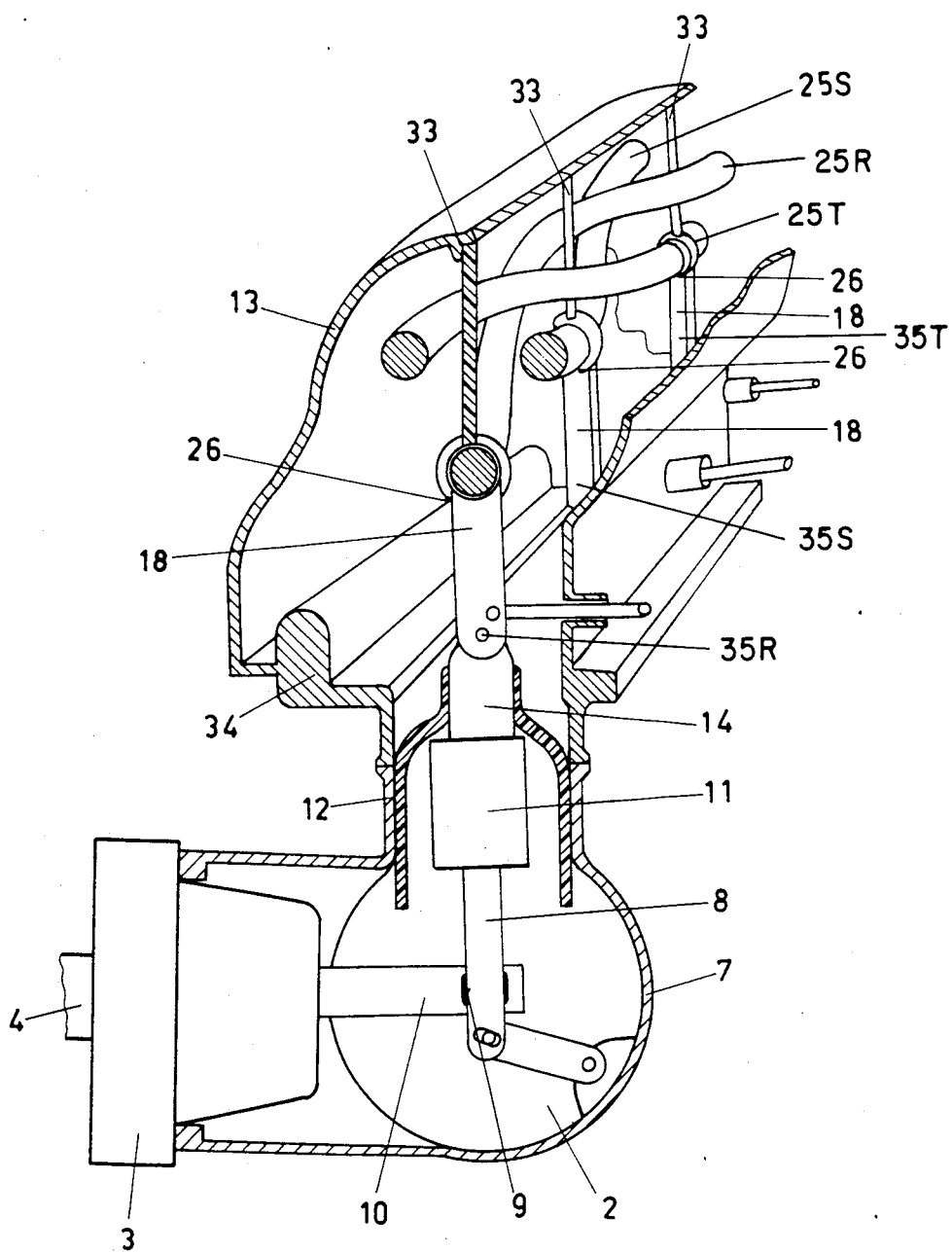
FIG. 3 is a sectional view of a further embodiment of the switching system according to the invention.

In the further embodiment, shown in FIG. 3, of the switching system according to the invention, the three-phase busbars 25R, 25S, 25T, held by support insulators 33 in the lower busbar housing 13, is provided with three phase conductors wound helically around a common axis, not shown. The helical twisting makes it possible for the fixed contacts 26 of the isolating switches 35R, 35S, 35T of each of the three phases to be displaced in the axial direction and in each case to be arranged at equal distances from the current connections 14 of the associated circuit breaker 2. For this reason, the fixed contacts 26 of the isolating switches 35R, 35S, 35T can be mounted directly on the associated phase conductors of the busbars 25R, 25S, 25T. In addition, the isolating switches 35R, 35S, 35T can all be of identical construction and arranged at mutually corresponding locations of the lower busbar housing 13. Thus, this development of the system according to the invention quite considerably reduces the volume of the lower busbar housing 13.

The isolating switches 35R, 35S, 35T shown in FIG. 3 are provided with moving contacts 18 which can be brought from the on position shown via an off position, not shown, into engagement with an earth or ground contact 34 (earth position). It is also possible to construct the isolating switches 35R, 35S, 35T in accordance with the illustrative embodiment of FIG. 2, that is to say without earthing contact, and to effect the earthing of the current connection 14 via an additional earthing switch, if necessary. In accordance with the illustrative embodiment of FIG. 2, it is conceivable to use such busbars, having phase conductors which are helically wound around a common axis, also in systems comprising two busbars.

The invention which is intended to be protected herein should not be construed as limited to the particular forms disclosed, as these are to be regarded as illustrative rather than restrictive. Variations and changes may be made by those skilled in the art without departing from the spirit of the present invention, as set forth in the appended claims.

What is claimed is:

1. A metal encapsulated switch device having a metal housing, comprising:
   a circuit breaker having a breaker housing enclosing a movable circuit breaker contact and a stationary circuit breaker contact,
   a gas filled first busbar housing separated from said movable circuit breaker contact and said stationary circuit breaker contact in a gas-tight manner and having a first isolating switch and a first busbar arrangement therein,
   a current connection electrically connected to said stationary circuit breaker contact and to a movable contact of said first isolating switch, and
   an insulating wall arranged in a gas tight manner in an opening of said first busbar housing, said insulating wall defining at least a part of said breaker housing and supporting said current connection.

2. The switch device according to claim 1, further comprising:
   an electrical coupling part connecting said current connection and said movable contact of said first isoating switch and being connectable to a ground contact.

3. The switch device according to claim 2, wherein said current connection and said coupling part are connected at a plug connector.

4. The switch device according to claim 2, wherein said coupling part is mounted on a support insulator located in said busbar housing, said support insulator including a tubular part for guiding an electrically conducting rod which forms a part of said ground contact and has a first end for being inserted into said electrical coupling part.

5. The switch device according to claim 4, wherein said support insulator has an insulating material portion on which said first busbar arrangement and a stationary contact of said first isolating switch are supported.

6. The switch device according to claim 5, wherein said support insulator is supported between a cover which seals said first busbar housing in a gas-tight manner and said contact supported from said coupling part.

7. The switch device according to claim 6, wherein a second busbar housing is mounted on top of said cover of said first busbar housing, said second busbar housing enclosing a second busbar arrangement and a second isolating switch electrically connected to a grounding switch and to a second end of said electrically conducting rod.

8. The switch device according to claim 1, wherein said first busbar arrangement includes at least two phase conductors which are helically wound around a common axis.

9. The switch device according to claim 8, wherein said first isolating switch is a three-position isolating switch.

* * * * *